United States Patent [19]
Olmstead et al.

[11] Patent Number: 6,155,488
[45] Date of Patent: *Dec. 5, 2000

[54] OPTICAL READER WITH ADAPTIVE EXPOSURE CONTROL

[75] Inventors: Bryan L. Olmstead; James E. Colley, both of Eugene, Oreg.

[73] Assignee: PSC Inc., Webster, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,408

[22] Filed: Aug. 23, 1996

Related U.S. Application Data

[60] Provisional application No. 60/003,256, Aug. 25, 1995.

[51] Int. Cl.$^7$ .................................................. G06K 7/10
[52] U.S. Cl. .................................. 235/440; 235/462.01
[58] Field of Search ............................. 235/455, 462.01, 235/462.27, 439, 440, 462.26, 462.29

[56] References Cited

U.S. PATENT DOCUMENTS

| | | | |
|---|---|---|---|
| 4,542,528 | 9/1985 | Sanner et al. | 382/62 |
| 4,825,291 | 4/1989 | Mimura et al. | 358/213.19 |
| 4,942,473 | 7/1990 | Zeevi et al. | |
| 5,134,489 | 7/1992 | Sauer . | |
| 5,247,161 | 9/1993 | Actis et al. | 235/462 |

(List continued on next page.)

FOREIGN PATENT DOCUMENTS

| | | |
|---|---|---|
| 0 163 547 A2 | 12/1985 | European Pat. Off. . |
| 01 185 450 A2 | 6/1986 | European Pat. Off. . |
| 55-115164 | 9/1980 | Japan .................... G06K 7/10 |
| 2 186 149A | 8/1987 | United Kingdom . |
| 2 255 465A | 11/1992 | United Kingdom . |
| 2 262 678A | 6/1993 | United Kingdom . |
| 2 269 505A | 2/1994 | United Kingdom . |

OTHER PUBLICATIONS

Andoh F., et al., "A 250,000–pixel Image Sensor with FET Amplification at Each Pixel for High–Speed Television Cameras", printed in transcripts of 1990 *IEEE International Solid–State Circuits Conference* (Digest of Technical Papers), pp. 212–213; 298.

Denyer P.B., et al., "CMOS Image Sensors for Multimedia Applications", Proceedings of the *IEEE Custom Integrated Circuits Conference* (1993), pp. 11.5.1 to 11.5.4.

Fossum E., "Active Pixel Sensors Challenge CCDs", *Laser Focus World* (Jun. 1993), pp. 83–85.

(List continued on next page.)

*Primary Examiner*—Mark Tremblay
*Attorney, Agent, or Firm*—Lyon & Lyon LLP

[57] ABSTRACT

An optical or symbol reader including CMOS circuitry preferably integrated on a single chip. A CMOS optical reader chip comprises a CMOS imaging array having a plurality of pixels each with a dedicated pixel-site circuit. Charge is accumulated at each pixel location transferred upon demand to a common bus. In a preferred embodiment, exposure time of the imaging array is controlled using a feedback loop. One or more exposure control pixels are positioned adjacent to or within the imaging array and receive light along with the imaging array. The charge of the exposure control pixel or pixels is measured against a threshold level, and the amount of time taken to reach the threshold level determines the time exposure of the pixels of the imaging array. CMOS signal processing circuitry is employed which, in combination with the exposure control circuitry, minimizes time-to-read over a large range of light levels, while performing spatially optimal filtering. Clocking cycles and control signals are time-adjusted in accordance with the varying output frequency of the imaging array so as to provide invariant frequency response by the signal processing circuitry. A multi-dimensional CMOS imaging array is also provided having simultaneous pixel exposure with non-destructive readout of the pixel contents.

22 Claims, 10 Drawing Sheets

U.S. PATENT DOCUMENTS

| | | | |
|---|---|---|---|
| 5,262,281 | 11/1993 | Bauer et al. ............................ | 430/323 |
| 5,262,871 | 11/1993 | Wilder et al. . | |
| 5,309,243 | 5/1994 | Tsai ........................................ | 348/221 |
| 5,319,182 | 6/1994 | Havens et al. ......................... | 235/462 |
| 5,343,297 | 8/1994 | Tiemann et al. ....................... | 348/301 |
| 5,345,266 | 9/1994 | Denyer .................................... | 348/300 |
| 5,430,282 | 7/1995 | Smith et al. ............................ | 235/455 |
| 5,446,271 | 8/1995 | Cherry et al. . | |
| 5,461,425 | 10/1995 | Fowler et al. . | |
| 5,463,211 | 10/1995 | Arends et al. ......................... | 235/462 |
| 5,471,515 | 11/1995 | Fossum et al. . | |
| 5,521,366 | 5/1996 | Wang et al. ............................ | 235/454 |
| 5,627,366 | 5/1997 | Katz .................................. | 235/462.23 |
| 5,635,699 | 6/1997 | Cherry et al. . | |
| 5,665,959 | 9/1997 | Fossum et al. . | |
| 5,739,518 | 4/1998 | Wang ...................................... | 235/454 |
| 5,770,847 | 7/1998 | Olmstead . | |
| 5,784,102 | 7/1998 | Hussey et al. .......................... | 348/296 |
| 5,814,803 | 9/1998 | Olmstead et al. . | |
| 5,831,674 | 11/1998 | Ju et al. .................................. | 348/302 |

OTHER PUBLICATIONS

Mendis S.K., et al., "Low–Light–Level Image Sensor with On–Chip Signal Processing", *Proceedings of the SPIE,* vol. 1952, Aerospace Science and Sensing—Surveillance Sensors (1993), pp. 1–11.

Vellacott O., "CMOS in Camera", *IEEE Review,* (May 1994), pp. 111–114.

Search Report from British Application No. GB 9707140.1, dated Feb. 16, 2000.

Search and Examination Report from British Application No. GB 0001225.2, dated Feb. 16, 2000.

Search and Examination Report from British Application No. GB 0001224.5, dated Feb. 15, 2000.

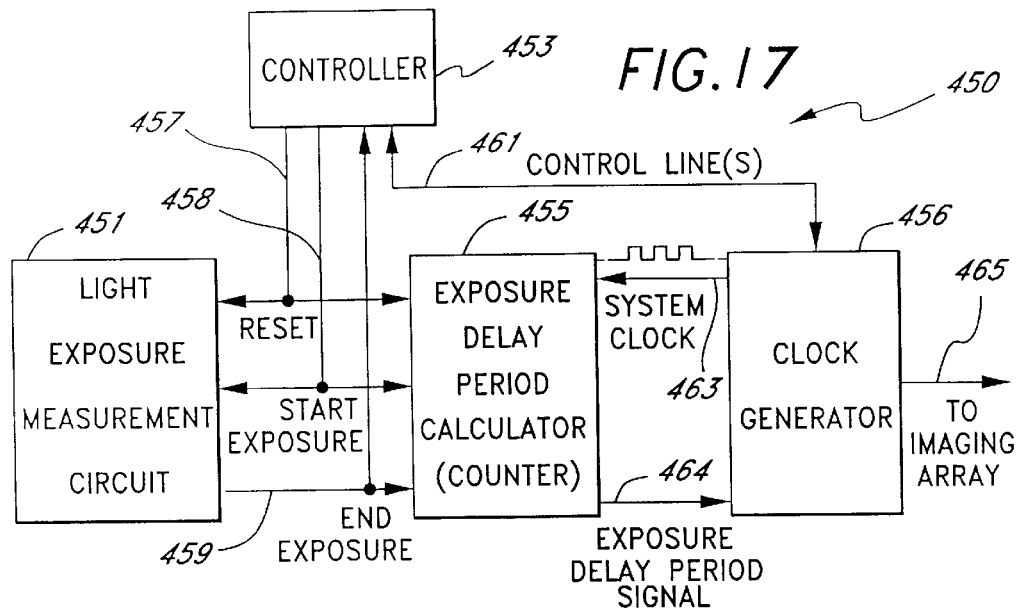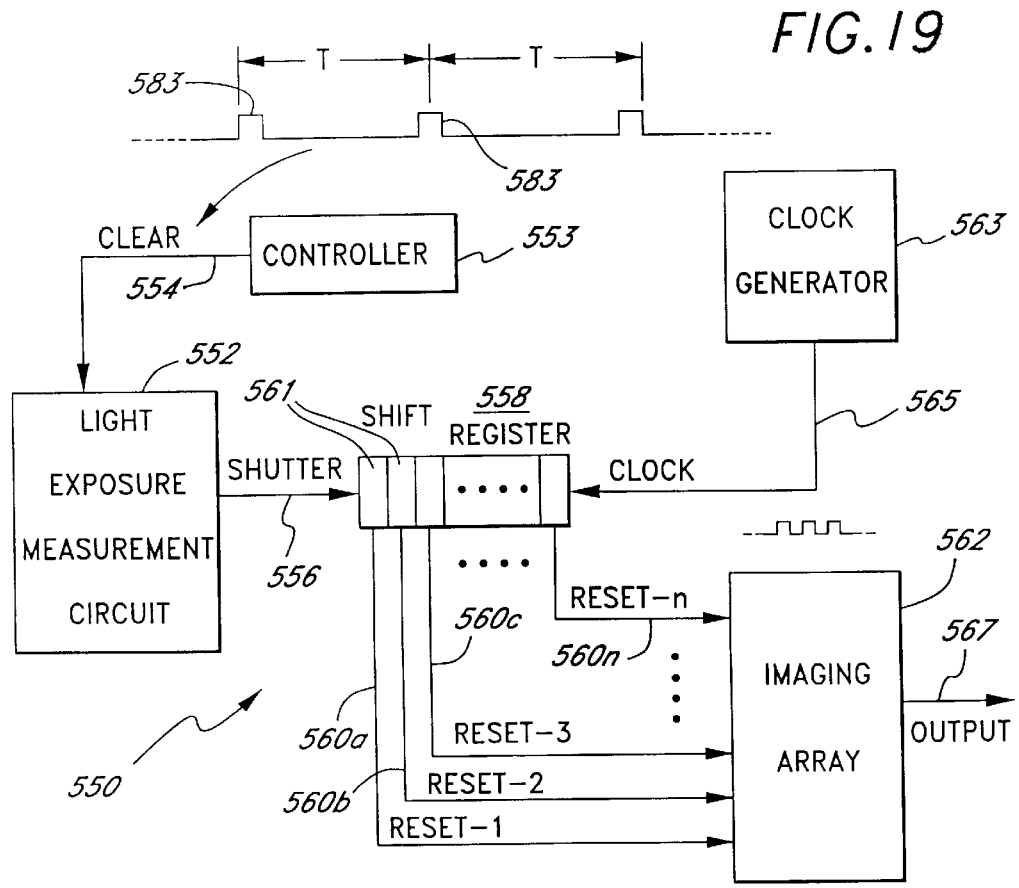

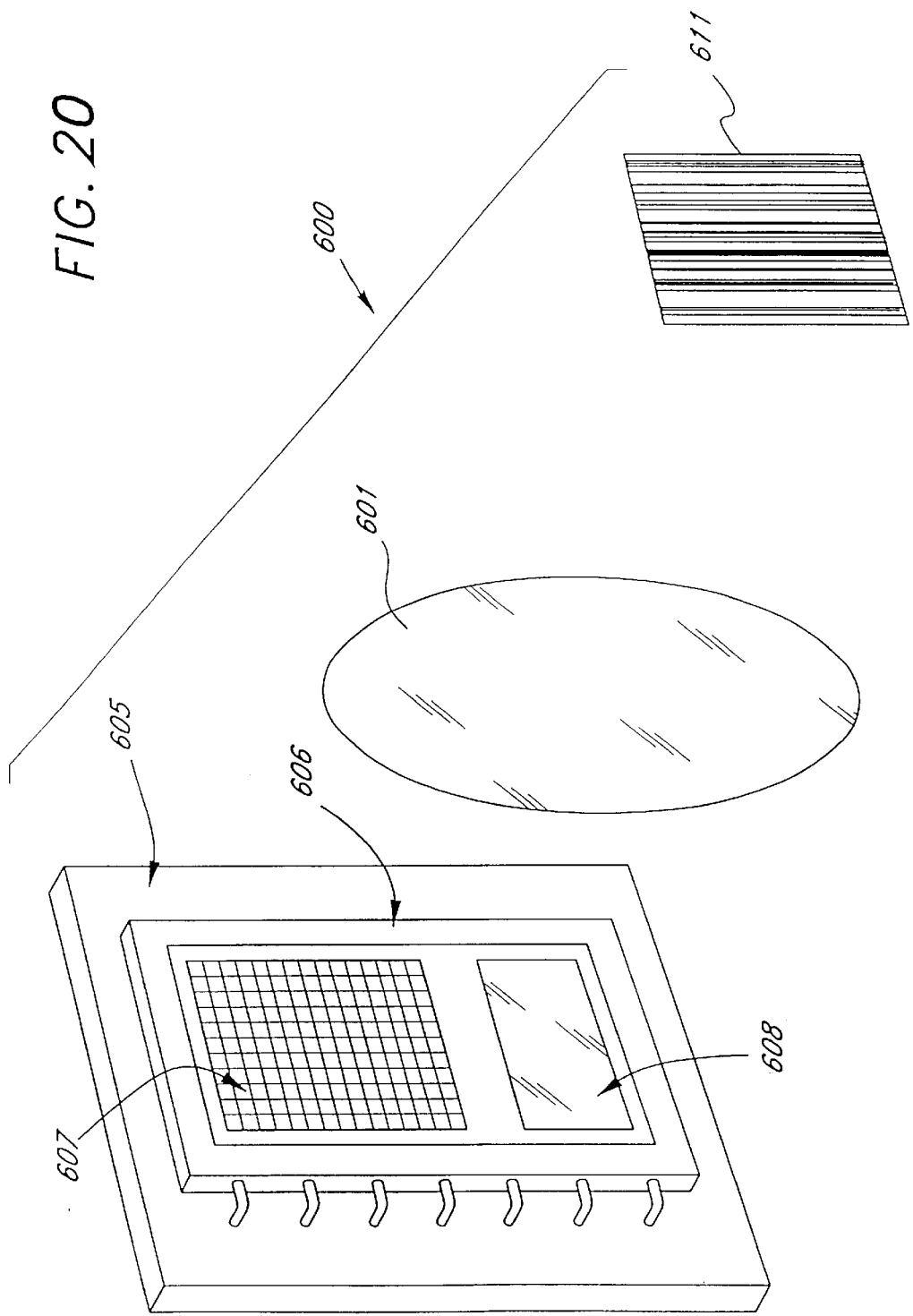

OPTICAL READER WITH ADAPTIVE EXPOSURE CONTROL

RELATED APPLICATION DATA

This application is a continuing application of U.S. Provisional Application Ser. No. 60/003,256 filed on Aug. 25, 1995, hereby incorporated by reference as if set forth fully herein.

BACKGROUND OF THE INVENTION

1) Field of the Invention

The field of the present invention relates to reading symbols such as bar codes, and more particularly to a bar code or symbol reader having integrated optical and signal processing circuitry.

2) Background

Currently available bar code readers typically have from ten to fifty integrated circuits, as well as several dozen mechanical and optical parts. The market demands, however, are for dramatically decreased cost and size of bar code readers, without sacrificing reliability or performance. A reduction in the number of parts used in bar code readers would help meet these demands.

Previous attempts to reduce, through various levels of integration, the number of parts in visible laser-based scanners have been fraught with difficulties. Visible laser diodes, which are typically made using AlGaInP material, cannot be directly integrated on a silicon substrate, which is where at least some part of the electronic or signal processing circuitry is likely to be resident. Hybrid approaches, whereby the laser diode is mounted to a thermally-conductive pad which in turn is mounted on a silicon substrate, have been demonstrated by Sony Corporation (for example, in their laser coupler used in compact disc products). In this type of construction, the performance of the electronic circuitry on the silicon substrate suffers because of the large thermal gradient across the die. Performance is also adversely affected by photo-recombination from stray laser light, causing an increase in noise levels. Moreover, reliability is also relatively poor, as with many laser-based scanner products, because of huge power density at the laser junction.

Some bar code readers use charge-coupled devices (CCDs) as a substitute for a laser diode. Integration of circuit components in these systems, however, is also difficult, primarily because CCD chips typically require highly-specialized metal-oxide semi-conductor (MOS) processes which are poorly suited for fabrication of other types of circuitry. For example, fabrication of high-transconductance field-effect transistors (FETs), generally needed in the construction of an operational amplifier, is not practical using the same MOS processes required of most CCD chips. Further, fabrication costs for this specialized process, per unit of silicon area, are considerably higher than those for conventional bipolar and CMOS processes, largely because very high silicon purity is needed to achieve reasonable charge transfer efficiency. Thus, integration of circuitry in a CCD-based bar code reader is difficult and, even if possible, would be relatively costly from a manufacturing standpoint.

The present inventors have therefore determined that it would be advantageous to provide a bar code or symbol reader having circuitry that is relatively easy to integrate, yet not prohibitively expensive to manufacture. It would further be advantageous to provide a bar code reader having a reduced number of parts, and, in addition, to provide a reduced-size bar code reader incorporating integrated optical and signal processing circuitry.

SUMMARY OF THE INVENTION

The present invention provides in one aspect an optical reader including integrated CMOS circuitry. A CMOS imaging array receives light at a multiplicity of pixel locations and converts the resulting charge to voltage locally at each pixel site. The charge is transferred upon demand directly to a common metal bus. The CMOS imaging array may be integrated with other CMOS circuitry in the optical reader.

In another aspect of the present invention, exposure time of the imaging array is controlled using a feedback loop. One or more exposure control pixels are positioned adjacent to or within the imaging array and receive light along with the imaging array. The charge of the exposure control pixel or pixels is measured against a threshold level, and the amount of time taken to reach the threshold level determines the time exposure of the pixels of the imaging array. Both the exposure control pixel or pixels and the control loop can be fabricated using the same CMOS process, and located on the same substrate as the imaging array. The exposure time may be optimally or near optimally set before the user enables the bar code reader, reducing the amount of time needed to read a symbol or code (e.g., a bar code label).

In another aspect of the invention, CMOS signal processing circuitry is employed which, in combination with the exposure control circuitry, minimizes time-to-read over a large range of light levels, while performing spatially optimal filtering. Clocking cycles and control signals are time-adjusted in accordance with the varying output frequency of the imaging array so as to provide invariant spatial frequency response by the signal processing circuitry. These signal processing schemes may be efficiently realized in CMOS.

In another aspect of the invention, a multi-dimensional imaging array is provided having simultaneous pixel exposure with non-destructive readout of the pixel contents. The multi-dimensional imaging array may comprise a two-dimensional pattern, such as a grid or other combination of linear imaging arrays, with certain selected pixels being utilized in more than one linear imaging array. The non-destructive readout capability allows the same pixels to be read out multiple times, once for each linear imaging array of which the pixel is a member.

Further variations and modifications to the above are also described herein.

BRIEF DESCRIPTION OF THE DRAWINGS

FIG. 17 is a block diagram of an adaptive exposure control loop.

FIG. 19 is a block diagram illustrating an alternative embodiment of an adaptive exposure control circuit.

FIG. 20 is a diagram of an optical reader including a lens and condensed CMOS circuitry.

DETAILED DESCRIPTION OF THE PREFERRED EMBODIMENTS

Figure 1:
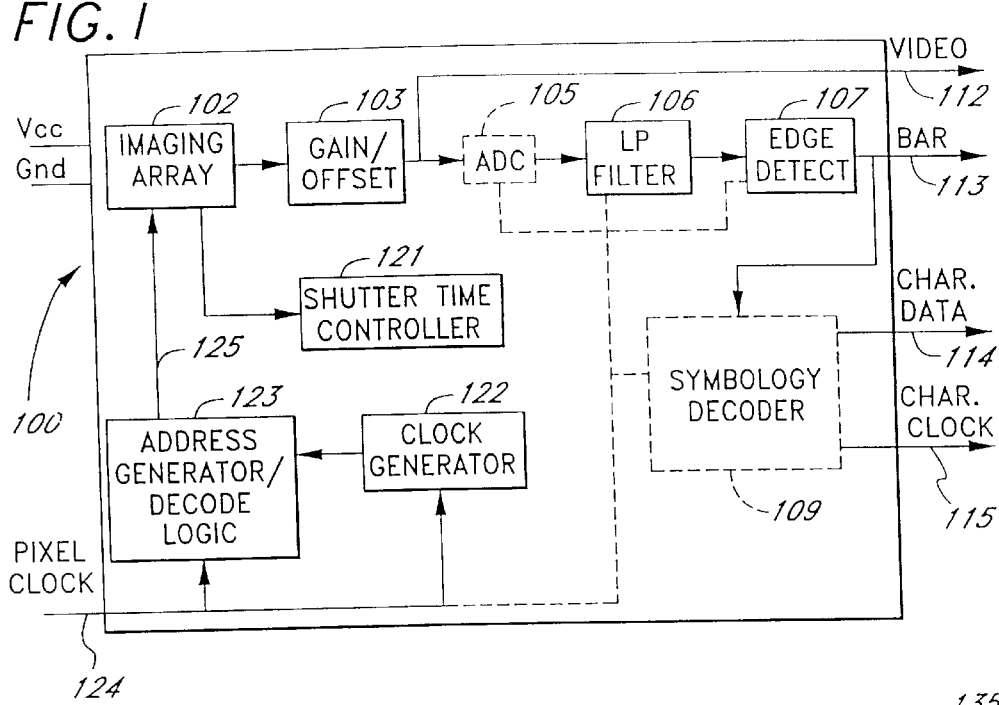
FIG. 1 is a block diagram of a preferred optical reader.

FIG. 1 is a block diagram of an optical reader having a preferred single-chip optical reader architecture. Each of the components shown in FIG. 1 is preferably integrated on the same chip using the same CMOS process and share the same silicon substrate. However, in some embodiments fewer than all of the components shown in FIG. 1 may be integrated in such a manner, or other additional components may also be integrated onto the same chip.

In FIG. 1 is shown a optical reader chip 100 comprising an imaging array 102 connected to a gain/offset block 103 and to a shutter time controller 121. The gain/offset block 103 may apply a constant gain and offset for all pixels, or may provide unique gain and/or offset for each pixel to compensate for pixel-to-pixel non-uniformities. The gain/offset block 103 outputs a video signal 112 that is optionally connected to an analog-to-digital (A/D) converter 105 for conversion from analog to digital format. The video signal, whether in analog form or digitized by A/D converter 105, is then passed to a low pass filter 106. The low pass filter 106 is connected to an edge detector 107, which outputs a BAR signal 113. The BAR signal 113 is also connected to an optional on-chip symbol decoder 109, which outputs a character data signal 114 and a character clock signal 115.

Also shown in FIG. 1 is a pixel clock signal 124 connected to an address generator/decode logic block 123 and to a clock generator 122. The pixel clock signal is optionally connected to the A/D converter 105 (if included), the low pass filter 106 (if digital), the edge detector 107 (if digital), and the symbology decoder 109 (if included on-chip). The address generator/decode logic block 123 is connected to the imaging array 102 and receives an input from the clock generator 122. The shutter time controller 121 is also connected to the clock generator 122.

In operation, the imaging array 102 receives light that is preferably gathered and focused by an imaging system (not shown) which may comprise one or more lenses and other conventional imaging components, and in particular may comprise a multi-focus lens and slitted aperture or other features described in copending U.S. application Ser. No. 08/363,258 filed on Dec. 23, 1994, now U.S. Pat. No. 5,770,847, or in U.S. application Ser. No. 08/576,203 filed on Dec. 21, 1995, now U.S. Pat. No. 5,814,803, both of which are hereby incorporated by reference as if set forth fully herein.

The imaging array 102 comprises a plurality of photo-sensitive pixels, and outputs a signal indicative of a level of received light at each selected pixel location. When a pixel receives light, a charge builds up at the pixel location. When the charge is read out onto an output bus, as explained hereafter, a voltage, proportional to the number of electrons collected, appears on the output bus.

In a preferred embodiment, each pixel is individually accessible by a select signal applied to the imaging array 102. In FIG. 1, a select signal 125 for this purpose is applied to the imaging array 102 from the address generator/decode logic block 123. The select signal 125 comprises an address location corresponding to a selected pixel of the imaging array 102. In a preferred embodiment, the address generator/decode logic block 123 generates pixel addresses in a sequential fashion such that pixels of imaging array 102 are selected and read out sequentially under control of select signal 125. Alternatively, pixels may be selected other than sequentially, and some pixels may be read out more than once, as described with respect to various embodiments detailed further herein.

Figure 6:
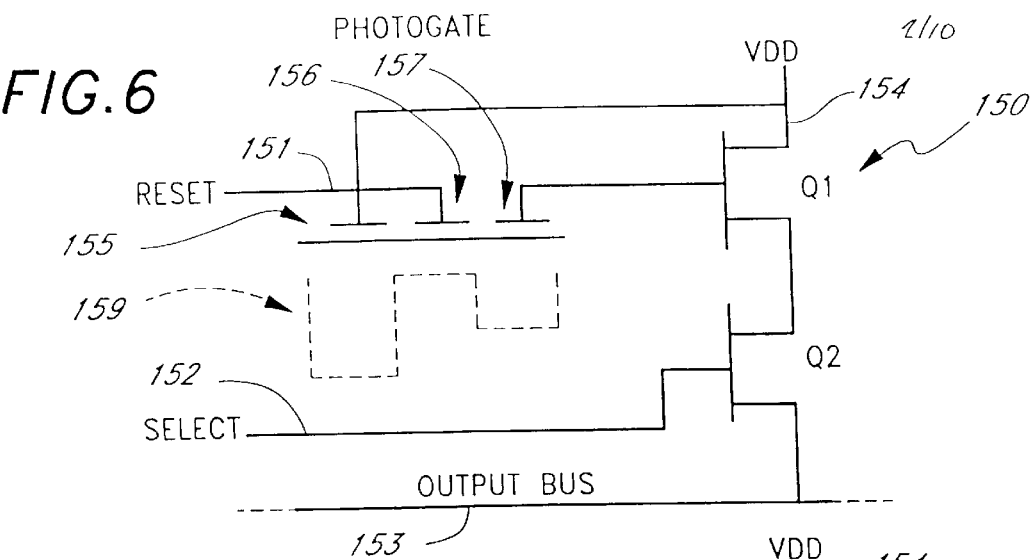
FIGS. 6 and 7 are diagrams of a preferred pixel-site circuit forming part of an active-pixel CMOS array.
Figure 7:
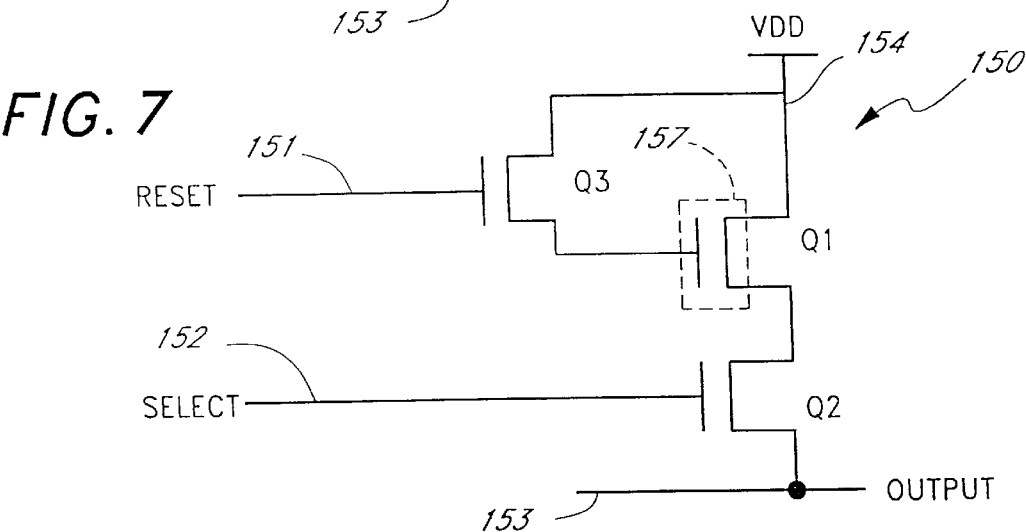

FIGS. 6 and 7 show in more detail a preferred pixe-site circuit 150 forming part of an active-pixel CMOS imaging array, as may be used for imaging array 102. FIG. 7 depicts a circuit schematic of the pixel site circuit 150, while FIG. 6 depicts a schematic of the pixel site circuit including representation the charge stored in MOSFET Q1 using a potential graph 159.

The pixel-site circuit 150 of FIGS. 6 and 7 comprises a source follower metal-oxide silicon field-effect transistor (MOSFET) Q1 which converts charge to voltage and provides a low impedance output at the pixel location. In operation, valence electrons are excited into the conduction band by photons impinging upon an extended photogate region 157 of the source follower MOSFET Q1. These free electrons are stored in a potential well, which is bounded during the collection period by holding reset line 151 at a low potential. When the collection period is complete, a select line 152 is asserted, turning output select MOSFET Q2 on and biasing source follower MOSFET Q1 in its active region. A voltage, proportional to the number of electrons collected, then appears on the output bus 153. Increasing the voltage of reset line 151 sufficiently activates MOSFET Q3 thereby opening up the potential well and allowing the photo-generated electrons to drain to the supply voltage node VDD 154, clearing the stored charge.

If its inactive potential is appropriately chosen, the reset gate 156 shown in FIG. 6 (i.e., the gate of Q3 shown in FIG. 7) may function as an overflow mechanism when the number of electrons exceeds the capacity of the potential well. This helps prevent so-called "blooming" caused by overflow of electrons from one pixel spilling into adjacent pixels.

Figure 8:
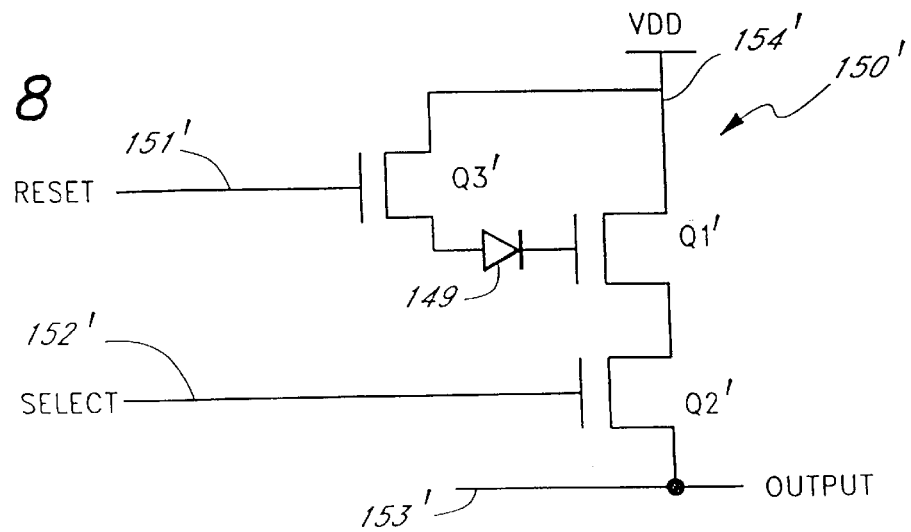
FIG. 8 is a diagram of an alternative embodiment of a pixel-site circuit.

In an alternative embodiment, current is generated using a conventional P-N or P-I-N photodiode (i.e., a diode having an undoped silicon region sandwiched between P-doped and N-doped regions), the current being integrated over the exposure time and stored on the gate capacitance of a MOSFET. This alternative embodiment is illustrated in FIG. 8. The operation of the FIG. 8 circuit is analogous to that of FIG. 7, except for the addition of a photo-sensitive diode 149, and the use of a MOSFET Q1' that has an ordinary gate instead of a photogate. In operation, the photo-sensitive diode 149 generates a current in response to light incident upon the photo-diode 149, and builds up a charge at the gate of the MOSFET Q1'. The voltage level associated with the stored charge can be read out by assertion of select signal 152', and the stored charge can be dumped by assertion of reset signal 151'.

Figure 16:
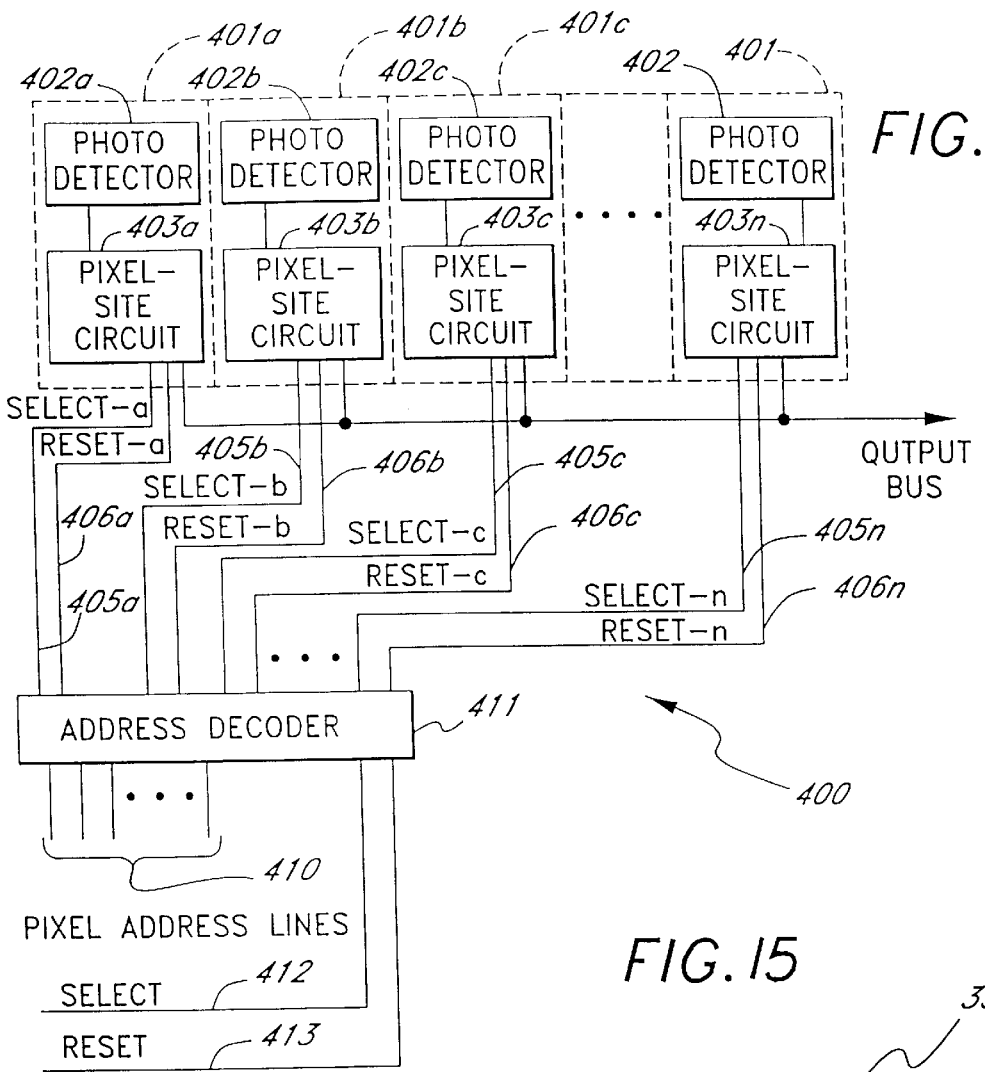
FIG. 16 is a block diagram of an imaging array and associated address circuitry according to one embodiment of the present invention.

Imaging array 102 preferably comprises a plurality of pixels each having a pixel-site circuit 150 such as shown in FIGS. 6 and 7. A block diagram of an exemplary imaging array along with associated selection circuitry is shown in FIG. 16. The FIG. 16 imaging array 400 comprises a plurality of pixels 401a–n, comprising a plurality of photo-sensitive detectors 402a–n, one for each pixel 401a–n. Each of the plurality of photo-sensitive detectors 402a–n is connected to a pixel-site circuit 403a–n (each of which comprises, for example, a pixel-site circuit such as shown in FIGS. 6 and 7). FIG. 16 also shows a plurality of select signals 405a–n and reset signals 406a–n, one for each pixel 401a–n.

Each pixel-site circuit 403a–n is connected to a common output bus 408. An address select signal 410 is input to the imaging array and selection circuitry, and is connected to an address decoder 411. A master select signal 412 and master reset signal 413 are also provided to address decoder 411. The address decoder 411 decodes the address select signal 410 and, based on its inputs, asserts one of select signals 405a–n and/or one of reset signals 406a–n at a time, thereby activating the corresponding one of pixel-site circuits 403a–n. If its select signal 405 is active, then the selected pixel-site circuit 403 transfers its accumulated charge to the common output bus 408. If its reset signal 406 is active, then the selected pixel-site circuit 403 dumps its charge and clears its photo-detector 402. Using the address select signal 410, pixels 401a–n may be accessed sequentially or randomly, so that the contents of all or a selected number of the pixels 401a–n may be read out.

In an alternative embodiment, a serial shift register may be used in place of address decoder 411. An initial pulse provided to the serial shift register ripples from stage to stage of the serial shift register. Each stage of the serial register is tapped, and the output of each stage is connected to an individual pixel as the control signal for that pixel. The control signal can be gated with clock signals in various fashions that will be apparent to one skilled in the art to generate the pulses needed for the reset and select signal. An advantage of the alternative embodiment using a serial shift register is its potential savings of required silicon area over a decoder embodiment.

Figure 9:
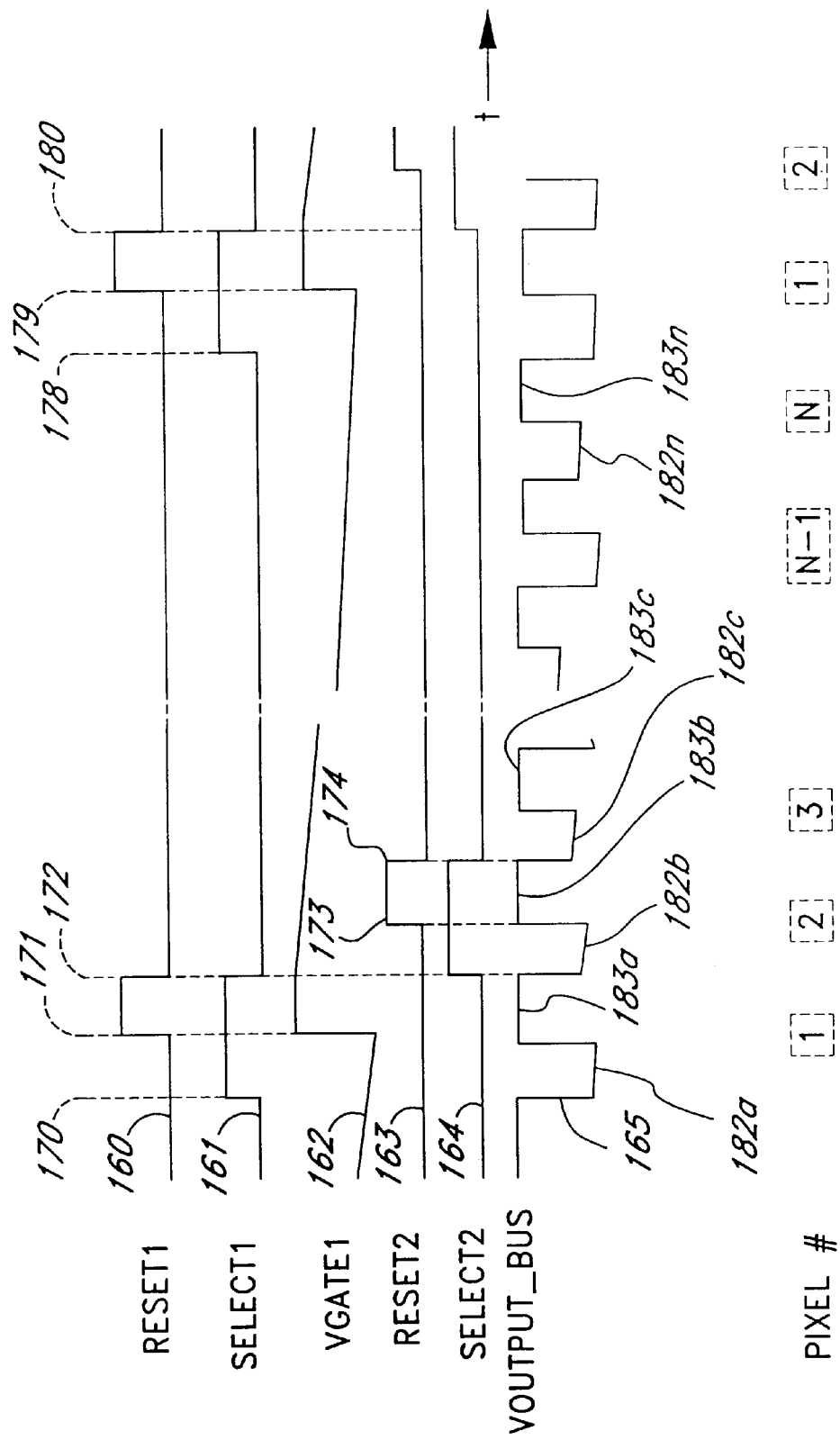
FIG. 9 is a timing diagram associated with the circuit of FIGS. 6 and 7.

FIG. 9 is a timing diagram associated with the FIG. 16 imaging array and selection circuitry. The FIG. 9 diagram shows relative timing for two adjacent pixels 401 of the FIG. 16 imaging array 400, but can be extrapolated to cover an arbitrary number N of pixels 401.

As noted, each pixel is provided with its own select line 405a–n and reset line 406a–n. FIG. 9 shows the timing of a select signal 161 and reset signal 160 for a first pixel 401 on the same graph as a select signal 164 and reset signal 163 for a second pixel 401. FIG. 9 also depicts the gate voltage signal 162 corresponding to the voltage stored by the photogate 157 (see FIGS. 6 and 7) of the pixel-site circuit 403 for the first pixel 401, and the output bus voltage signal 165 showing changes in the voltage level of the output bus 408 (or output bus 153 in FIGS. 6 and 7).

When the first pixel 401 is selected by select signal 161 going high, the output of the first pixel 401 is sampled on the output bus 408. Thus, at the same point 170 where select signal 161 goes high, the output bus voltage signal 165 takes on the level of the voltage of gate voltage signal 162. This information may be passed along from the output bus 408 to another system component, such as gain/offset block 103 shown in FIG. 1. After the output of the first pixel 401 is read out, the reset signal 160 is activated, causing the first pixel 401 to dump its charge. Thus, at point 171, the voltage level shown for the gate voltage signal 162 is shown being reset to the supply voltage. During the reset signal active period between points 171 and 172, the dark level of the pixel 401 is sampled over the output bus 408, as reflected in output bus voltage signal 165, which information may likewise be passed along from the output bus 408 to another system component making use of the information.

The gate voltage signal 162 is clamped for as long as the reset signal 160 is held high. After the reset signal 160 goes low, the photo-detector associated with the first pixel 401 begins to integrating charge once again for the next read, as illustrated by the gradually downward sloping characteristic of the graph of the gate voltage signal 162.

The select signal 161 and reset signal 160 for the first pixel 401 are switched to low at substantially the same time. When those signals switch states at point 172, the select signal 164 for the next pixel 401 is activated. The output of the second pixel 401 is then sampled on the output bus 408, as reflected by the output bus voltage signal 165 shown in FIG. 9. After a sufficient reading time, the reset signal 163 for the second pixel 403 is activated, causing the second pixel 401 to dump its charge at point 173. When the charge has been dumped, the select signal 164 and reset signal 163 for the second pixel 401 switch states and, if desired, more pixels can be read.

The result of the timing pattern illustrated in FIG. 9 is to yield a signal voltage level 182a–n and a reset voltage level 183a–n for each pixel 401a–n, assuming all of the pixels 401a–n are read. The signal voltage level 182a–n is adjacent to the reset voltage level 183a–n for each pixel 401a–n. At the output of the imaging array 400, the signal voltage level 182 may be subtracted from the reset voltage level 183 for each pixel 401, so as to reduce variations in threshold voltage of the source follower MOSFET Q1 used in the pixel-site circuit 402, potentially the largest contributor to fixed pattern noise. The subtraction circuitry (not shown) suitable for such a purpose is considered within the purview of one skilled in the art, and may be incorporated as part of the imaging array 102 circuitry and in any event is preferably resident on the single-chip optical reader 100 (see FIG. 1).

Figure 2:
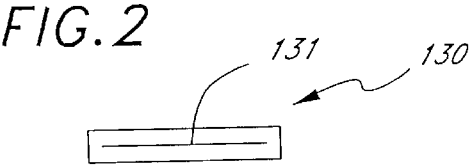
FIGS. 2 through 5 are diagrams of various alternative CMOS imaging array patterns.

FIGS. 2 through 5 depict various alternative CMOS imaging array patterns. FIG. 2 depicts a CMOS imaging array 130 having a single-line pattern 131 of pixels. The FIG. 2 imaging array 130 generally provides a lower performance in terms of initial read success rate, but is advantageous in terms of lower cost and its requirement of only a minimal amount of silicon area. Thus, the FIG. 2 imaging array pattern may be particularly suitable for a low-cost handheld optical reader.

Figure 3:
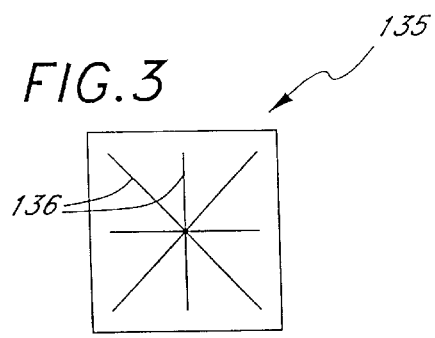
Figure 4:
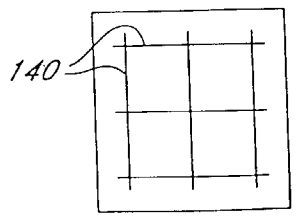
Figure 5:
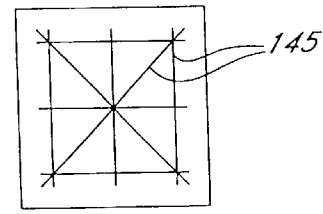

The alternative embodiments of FIGS. 3, 4 and 5 offer more reading area coverage and hence a shorter reading time on average. FIG. 3 depicts a CMOS imaging array 135 having an asterisk pattern 136 of pixels. FIG. 4 depicts a CMOS imaging array 139 having a grid pattern 140 of pixels. FIG. 5 depicts a CMOS imaging array 144 having a combined grid and asterisk pattern 145 of pixels. Patterns of pixels can also be electrically configured to suit the needs of each particular user, trading pattern density for pattern repetition rate, by disabling lines or portions of lines. The more lines (or portion of lines) to be read, the greater the coverage, but the fewer times a complete read can be accomplished in a given time period.

Conventional two-dimensional CMOS sensors have been fabricated for generic video-capture and machine vision applications, and are described, for example, in the following publications, each of which is incorporated herein by reference as if set forth fully herein: F. Andoh, et al., "A 250,000-pixel Image Sensor with FET Amplification at Each Pixel for High-Speed Television Cameras", printed in transcripts of 1990 *IEEE International Solid-State Circuits Conference* (Digest of Technical Papers), pp. 212–213; P. B. Denyer, et al., "CMOS Image Sensors for Multimedia Applications", *Proceedings of the IEEE Custom Integrated Circuits Conference* (1993), pp. 11.5.1 to 11.5.4; E. Fossum, "Active Pixel Sensors Challenge CCDs", *Laser Focus World* (June 1993), pp. 83–85; S. K. Mendis, et al., "Low-Light-Level Image Sensor with On-Chip Signal Processing", *Proceedings of the SPIE, vol.* 1952, *Aerospace Science and Sensing—Surveillance Sensors* (1993), pp. 1–11; and O. Vellacott, "CMOS in Camera", *IEEE Review* (May 1994), pp. 111–114.

In conventional two-dimensional CMOS sensors, charge is converted to voltage locally at the pixel site and transferred upon demand via a metal bus. In contrast, a CCD sensor typically requires that charge be transferred pixel-to-pixel across the CCD array, and not converted to voltage until it reaches the output amplifier. Because the need for charge transfer over long distance, as done with a CCD array, is alleviated by using a CMOS sensor with local pixel-site charge-to-voltage conversion, process requirements for fabrication of the imaging array 102 may be substantially relaxed over the processing requirements of a CCD array. Relaxed processing requirements lead to more economical manufacture of integrated chips.

The imaging array 102 of FIG. 1, embodied as, for example, any of the imaging arrays shown in FIGS. 2 through 5, outputs a signal indicative of a level of received light at each selected pixel location. As depicted in FIG. 1, the imaging array 102 is preferably connected to the gain/offset block 103, which amplifies or otherwise conditions the signal output from imaging array 102 and outputs video signal 112. Video signal 112 is low pass filtered by low pass filter 106 and then sent to the edge detector 107. Edge detector 107 detects, in any of a variety of manners well known in the art (such as described, for example, in U.S. Pat. No. 5,463,211, incorporated herein by reference as if fully set forth herein), transitions in the video signal 112 corresponding to transitions between lighter and darker portions of the symbol read. The edge detector 107 outputs bar signal 113 which contains the edge detection information.

The video signal 112 output from gain/offset block 103 may, as previously noted, optionally be converted to a digital form by optional A/D converter 105 (shown in dotted lines in FIG. 1). If A/D converter 105 is used, then the low pass filter 106 may comprise a digital filter such as an infinite impulse response (IIR) filter or finite impulse response (FIR) filter.

Bar signal 113 output from edge detector 107 is provided to a symbology decoder 109, which identifies the symbology of the symbol read in any of a variety of manners well known in the art, and outputs character data signal 114 and character clock signal 115. The symbology decoder 109 is optionally resident on the same chip as the other circuitry depicted in FIG. 1, and is therefore shown in dotted lines.

In another aspect of the present invention, exposure time control circuitry is provided on-chip so as to adaptively adjust the amount of time the pixels of the imaging array 102 collect light, and to optimize reading time. A single pixel, adjacent to or resident in the imaging array 102, or multiple pixels scattered about the imaging array 102 can be used to provide continuous feedback of the received light level to an exposure time control loop.

Figure 15:
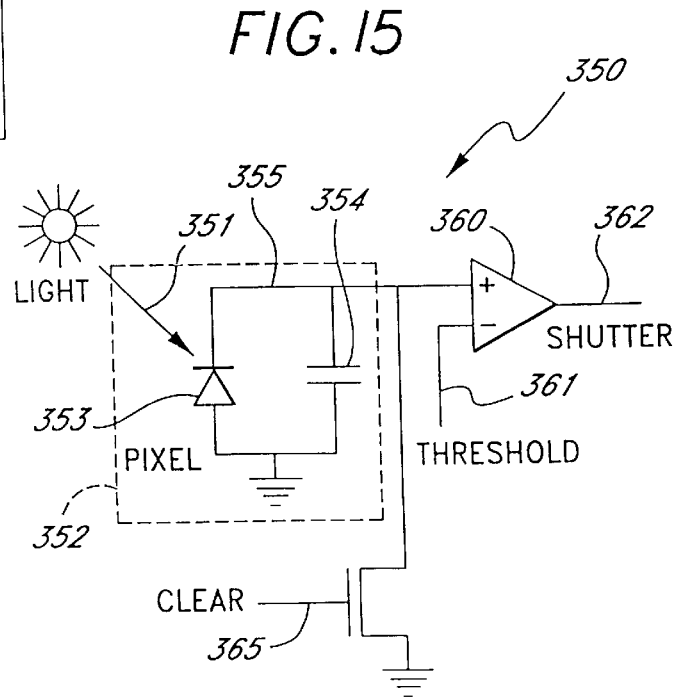
FIG. 15 is a diagram of a single-pixel controlled adaptive exposure circuit.

FIG. 15 is a diagram of an exemplary light exposure measurement circuit 350 comprising a single photo-detector 352. The FIG. 15 photo-detector 352 comprises, in this example, a photo-electric diode 353 connected in parallel as shown with a capacitor 354. However, any suitable photo-detector architecture will suffice. The photo-sensitivity of the photo-detector 352 is preferably approximately the same as that of the pixels of the imaging array 102. If, for example, the photo-detector 352 is constructed in a similar fashion to the photo-sensitive elements of the imaging array 102, then the photo-detector 352 and the photo-sensitive elements of the imaging array 102 should preferably be of approximately the same size, so that the single photo-detector 352 will be an accurate gauge of how much light has been received and absorbed by the imaging array 102.

The photo-detector 352 is used to measure light exposure of the imaging array 102. During a read operation, the photo-detector 352 collects charge in its potential well until the voltage produced by this charge exceeds the voltage level of a threshold signal 361. The photo-detector voltage on line 355 is compared against threshold signal 361 using a comparator 360. When the voltage level of threshold signal 361 is exceeded, comparator 360 changes state causing its output shutter signal 362 to change state, ending the exposure for all pixels of the imaging array 102. Before the next exposure period, a clear signal 365 is asserted, draining the accumulated charge from the photo-detector 352 (i.e., from capacitor 354).

Using an exposure control loop responsive to the shutter signal 362, the amount of time that the pixels in the imaging array 102 are exposed to incoming light is proportional to the time it takes for photo-detector 352 (the exposure control pixel) to charge to the threshold voltage of threshold signal 361. The threshold voltage of threshold signal 361 can be varied to change the relative strength of the signal level output from the imaging array 102.

Two alternative system timing arrangements are disclosed for the adaptive exposure control loop. The first timing arrangement is illustrated in FIGS. 10 and 11, and the second timing arrangement is illustrated in FIG. 12.

Figure 10:
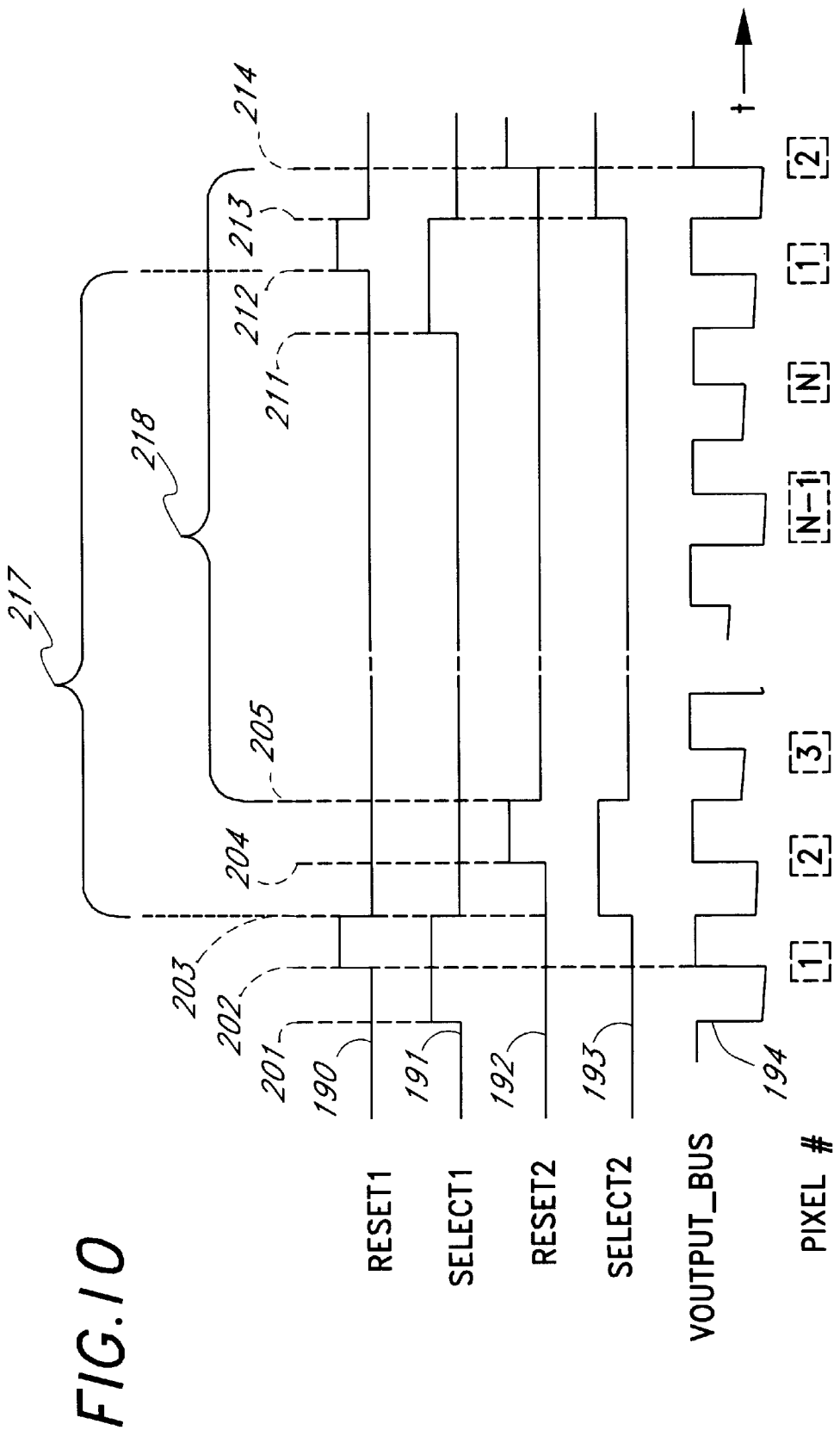
FIGS. 10 and 11 are timing diagrams illustrating the operation of a preferred optical reader including adaptive exposure circuitry in low level light and high level light, respectively.
Figure 11:
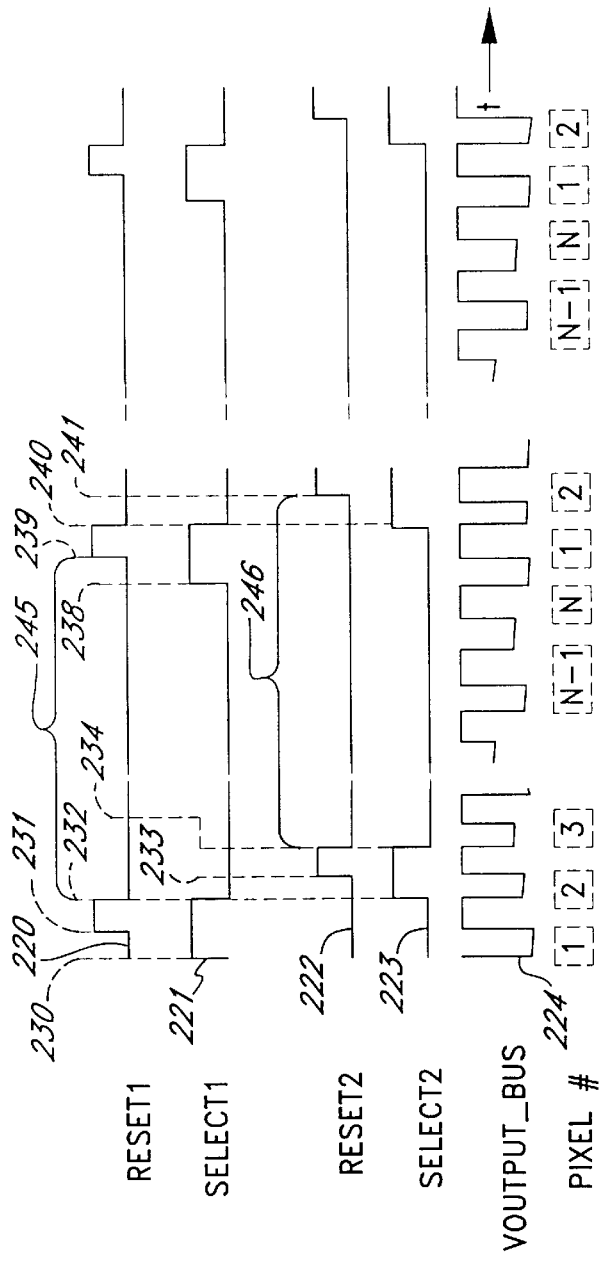
Figure 12:
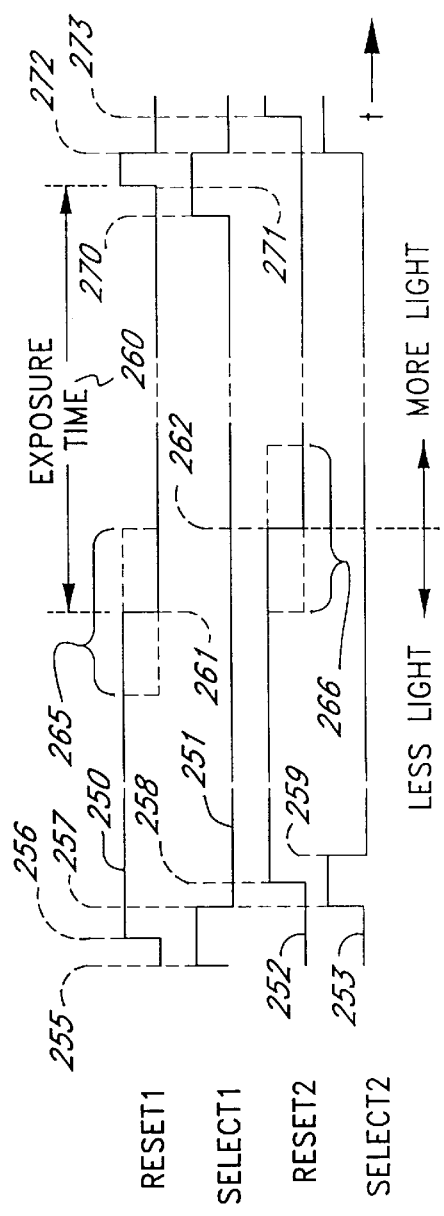
FIG. 12 is a timing diagram illustrating operation of an alternative embodiment of an optical reader including adaptive exposure circuitry.

The timing arrangement of FIGS. 10 and 11 involves varying the frequency of all appropriate clocks and control signals simultaneously in response to changes in light level as detected by the light exposure measurement circuitry (such as that of FIG. 15). The exposure interval is defined for the purposes of FIGS. 10, 11 and 12 as the time between the falling edge of the reset signal and the next assertion of the reset signal for a given pixel. For example, in FIG. 9, the exposure interval for the first pixel starts at point 172, the falling edge of reset signal 160, and ends at point 179 with the next assertion of reset signal 160.

The exposure interval increases as the measured light level decreases, and decreases as the measured light level increases, as measured by the light exposure measurement circuitry. FIG. 10 depicts a situation where the system is operating in a relatively low light level. The signals 190, 191, 192 and 193 in FIG. 10 are analogous to signals 160, 161, 163 and 164, respectively, depicted in FIG. 9. The exposure time period 217 of the first pixel is the time period starting from point 203, the falling edge of reset signal 190, and ending at point 212 with the next assertion of reset signal 190. Similarly, the exposure time period 218 of the second pixel is the time period starting from point 205, the falling edge of reset signal 192, and ending at point 214 with the next assertion of reset signal 192. As compared against FIG. 11, the exposure time periods 217 and 218 are quite long, and the frequency of transitions on the output bus, as reflected by output bus signal 194, is fairly low.

FIG. 11, in contrast, depicts a situation where the system is operating in a relatively high light level. The signals 220, 221, 222, and 223 are analogous to signals 190, 191, 192 and 193, respectively, depicted in FIG. 10, and to signals 160, 161, 163 and 164, respectively, depicted in FIG. 9. Similar to FIG. 10, the exposure time period 245 of the first pixel is the time period starting from point 232, the falling edge of reset signal 220, and ending at point 239 with the next assertion of reset signal 220. Similarly, the exposure time period 246 of the second pixel is the time period starting from point 234, the falling edge of reset signal 222, and ending at point 241 with the next assertion of reset signal 222. As compared against FIG. 10, the exposure time periods 245, 246 are relatively short, and the frequency of transitions on the output bus, as reflected by output bus signal 194, is fairly high.

The second alternative system timing arrangement is illustrated in FIG. 12. In the FIG. 12 timing arrangement, the data clock frequency is kept constant, and instead the duty cycle of the reset signal for each pixel is varied, thereby changing the exposure time in response to changes in the received light level. As shown in FIG. 12, a select signal 251 for a first pixel (such as a pixel 403 shown in FIG. 16) is asserted at point 255 in order to read out the contents of the first pixel. After the first pixel is read, a reset signal 250 for the first pixel is asserted at point 256 to clear the first pixel. After a period of time sufficient to clear the first pixel, the select signal 251 is de-asserted, and a select signal 253 for a second pixel is asserted at point 257.

Unlike the timing arrangement of FIG. 9, when the select signal 251 is de-asserted, the reset signal 250 is not necessarily de-asserted at the same time. Rather, the reset signal 250 is maintained in an active state for a variable amount of time thereafter, as determined by the received light level. The less light as detected by the light exposure measurement circuitry, the sooner the reset signal 250 is de-asserted. Conversely, the more light as detected by the light exposure measurement circuitry, the later the reset signal 250 is de-asserted.

FIG. 12 illustrates that the timing of the falling edge of the reset signal 250 may vary. Although an exemplary range 265 within which the falling edge of the reset signal 250 may lie is depicted in FIG. 12, this range 265 is for purposes of illustration only, and the actual range may vary depending upon a variety of factors (such as, for example, the relative maximum and minimum amounts of light received by the optical reader). An exposure time period 260 for the first pixel is determined by the falling edge of the reset signal 250 at point 261 until the next assertion of the reset signal 250 at point 271 thereafter. The exposure time period for other pixels is determined in a similar manner.

The exposure time period 260 is preferably the same for each pixel for a given reading cycle (i.e., for a single readout of all the pixels). The timing of falling edge of the reset signal 250 (as well as the reset signals for each of the other pixels) is controlled by the light exposure measurement circuitry. An exposure control loop responsive to the light exposure measurement circuitry provides a variable delay period following each select signal (e.g., select signal 251), after which the reset signal (e.g., reset signal 250) falls. The variable delay period results in a variable duty cycle of each reset signal, which thereby changes the exposure time in response to changes in light level. In operation, as described by way of example for a first pixel, the select signal 251 is activated just before the reset signal. If the reset signal 250 is high for a relatively large portion of the period between pulses in select signal 251, then the exposure time period for the pixel will be relatively short. If, on the other hand, the reset signal 250 is high for a relatively small portion of the period between pulses in select signal 251, then the exposure time period for the pixel will be relatively long.

Figure 18:
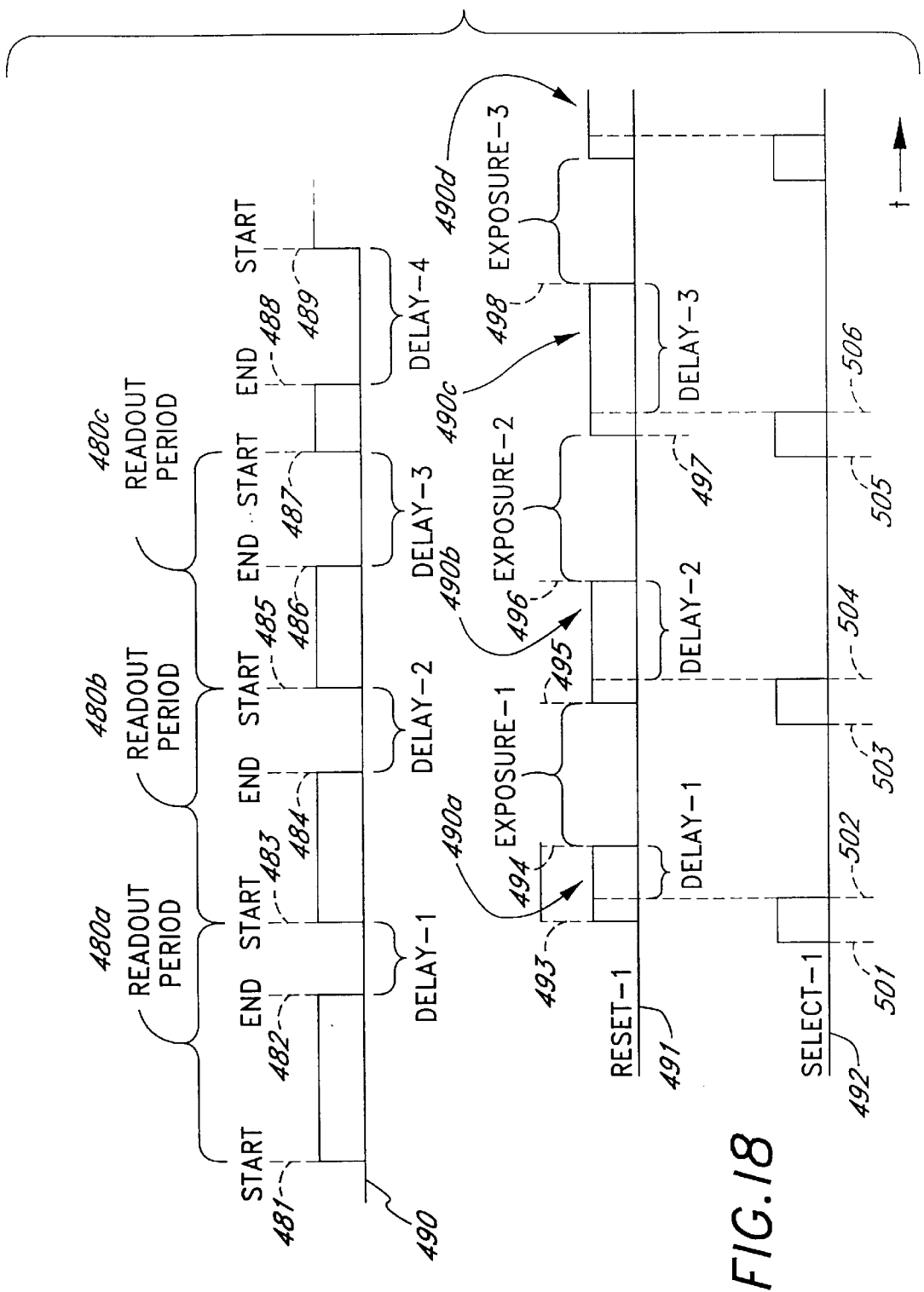
FIG. 18 is a timing diagram illustrating one means for providing an adjustable exposure time period.

FIG. 17 is a diagram illustrating one example of an exposure time control circuit 450 in accordance with one embodiment of the present invention. FIG. 18 is a timing diagram illustrating various waveforms associated with the FIG. 17 exposure time control circuit 450 and its effect on the pixel exposure timing of the imaging array (such as imaging array 102 in FIG. 1). The exposure time control circuit 450 of FIG. 17 comprises a light exposure measurement circuit 451 (such as light exposure measurement circuit 350 shown in FIG. 15), an exposure delay period calculator 455, a clock generator 456, and a controller 453. The clock generator 456 is also connected to the imaging array (not shown) by way of clock signals 465.

In operation, the controller 453 starts an exposure period of the light exposure measurement circuit 451 by activating a start exposure signal 458. Activation of the start exposure signal 458 also causes the exposure delay period calculator 455 to begin calculating the length of time it takes the light exposure measurement circuitry 451 to charge to a threshold voltage level, as described previously, for example, with respect to FIG. 15. The exposure delay period calculator 455 is connected to the clock generator 456 which outputs a system clock signal 463 to a variety of different destinations, including the exposure delay period calculator 455. The exposure delay period calculator 455 may be embodied as, for example, a digital counter which counts the number of clock period of the system clock signal 463 until the light exposure measurement circuit 453 is finished charging to the threshold voltage level. When that occurs, the light exposure measurement circuit 451 activates an end exposure signal 459 (similar, for example, to shutter signal 362 shown in FIG. 15), which causes the exposure delay period calculator 455 to stop counting clock cycles.

The number of clock cycles counted by the exposure delay period calculator 455 may be transferred to clock generator 456 using exposure delay period signal 464 (comprising, e.g., a set of digital lines each representing one bit). The clock generator 456 controls the readout period of each pixel of the imaging array. To adjust the length of exposure time of the pixels, the clock generator 456 adds the number of clock cycles calculated by the exposure delay period calculator 455 to each reset signal to maintain the reset signal for each pixel high for that additional time period.

FIG. 18 illustrates a timing diagram according to the FIG. 17 embodiment. FIG. 18 shows a series of fixed readout periods 480a, 480b, 480c, . . . during which pixel contents are read out. Exposure signal 290 shows the starting and stopping point of exposure time for the light exposure measurement circuit 451. Thus, for example, the controller 453 commences the exposure time of the light exposure measurement circuit 451 by activating the start exposure signal at point 481. The light exposure measurement circuit 451 activates the end exposure signal 459, indicating that the threshold voltage level has been reached, at point 482. Likewise, the controller 453 commences the exposure time of the light exposure measurement circuit 451 at additional points 483, 485, 487, and 489, and the light exposure measurement circuit 451 activates the end exposure signal 459 at additional points 484, 486, and 488.

The time between the end exposure point and the immediately following start exposure point comprises an exposure delay period denoted delay-1 490*a*, delay-2 490*b*, delay-3 490*c*, and so on in FIG. 18. The exposure delay period 490*a* serves as an amount of extension time for each pixel reset signal in the immediately following readout period. Thus, as shown in FIG. 18, reset signal 491 associated with a first pixel is asserted at point 493, during the active period of select signal 492 associated with the same first pixel, and is held high even after select signal 492 falls. The reset signal 491 is held high beyond the falling edge of the select signal 492 at point 502 for the duration of the exposure delay period 490*a* calculated by the exposure delay period calculator 455. Although the reset signal for each individual pixel is offset from the previous pixel's reset signal, each reset signal is held high for same exposure delay period 490*a* following the falling edge of the select signal associated with that pixel.

The effect of the FIGS. 17–18 circuitry and timing is to provide an adaptive exposure time for the pixels of the imaging array, with the exposure time varying in response to the amount of time it takes for the light exposure measurement circuitry 451 to reach the threshold voltage level. The exposure delay period 490*a*, 490*b*, 490*c*, . . . is determined anew for each readout period iteration, and is applied to each of the pixels read out during a given readout period 480*a*, 480*b*, 480*c*. . . (which will generally be all of the pixels). As can be seen in FIG. 18, the longer the time it takes the light exposure measurement circuit 451 to charge, the shorter the exposure delay period to be applied to the pixel reset signals, which thereby allows more time for the pixels to receive light. Conversely, the shorter the time it takes the light exposure measurement circuit 451 to charge, the longer the exposure delay period to be applied to the pixel reset signals, which thereby provides less time for the pixels to receive light.

As noted, the same exposure delay period 490*a*, 490*b*, 490*c*, . . . is preferably added to each pixel reset signal in a given readout. Thus, for example, all of the pixels which are to be read out during readout period 480*b* will be extended by exposure delay period 490*a*, all of the pixels which are to be read out during readout period 480*c* will be extended by exposure delay period 490*b*, and so on. Because the same exposure delay period 490 is preferably added to each pixel in a given readout period, and each pixel has a separate select signal and a separate reset signal, the exposure delay period is captured and stored using digital circuitry (such as exposure delay period calculator 455) rather than being utilized, for example, in an analog feedback loop that dynamically adjusts the reset signals. Alternative circuitry may be employed for this same function, such as, for example, an analog or digital exposure time measuring means utilizing a delay line with multiple taps, one tap for each pixel signal.

FIG. 19 is a diagram of an alternative circuit arrangement serving a similar function to that of FIG. 17. In FIG. 19, an adaptive exposure control circuit 550 comprises a light exposure measurement circuit 552, similar to the circuit shown in FIG. 15. The light exposure measurement circuit 552 receives a clear signal 554 from an oscillator 553, and outputs a shutter signal 556 to a serial-input shift register 558. Shift register 558 is clocked by clock signal 565, which is output from clock generator 565. Serial shift register 558 has a plurality of output reset signals 561*a–n*, one for each pixel site circuit. The reset signals 561*a–n* are connected to an imaging array 562, which produces a video output signal 567.

In operation, the oscillator 553 generates a clear signal 554 which preferably comprises a square wave of period T (corresponding to a fixed read-time cycle) with a relatively short duty cycle. A brief pulse 553 clears the exposure element (i.e., the photo-detector) of the light exposure measurement circuit 552 at the start of each exposure cycle. The light exposure measurement circuit 552 generates a shutter signal 556 in a manner similar to that shown in FIG. 15. When the shutter signal 556 switches states (in response, for example, to the photo-detector voltage exceeding a threshold voltage level), the change in the shutter signal 556 propagates down shift register 558 at a speed regulated by the clock signal 565. As the switch in signal states of the shutter signal 556 reaches each stage 561 of the shift register 558, it activates the corresponding one of reset signals 560*a–n*. Reset signals 560*a–n* are thereby sequentially activated, and remain so until the shutter signal 556 is reset in response to the clear signal 554 output from oscillator 553.

The effect of the FIG. 19 circuit is to achieve a variable duty-cycle exposure control signal for each pixel, tied to the output of light exposure measurement circuit 552, with a fixed read cycle of period T.

Comparing the operation of the timing arrangement of FIGS. 10 and 11 with that of FIG. 12, in general the timing arrangement of FIGS. 10 and 11 is preferred from the standpoint that it tends to minimize the time-to-read over a variety of different light levels, provided sufficient adjustments are made to the signal processing circuitry, as explained in more detail below. The timing arrangement of FIGS. 10 and 11 correlates the read time to the received light level, shortening the read time when received light is abundant, and lengthening the read time when received light is relatively scarce.

The FIG. 12 timing arrangement, on the other hand, uses a constant read-out time period, and adjusts the exposure time by adjusting the duty cycle of the reset signal of each pixel. The FIG. 12 timing arrangement therefore generally provides a constant read-out time period that is fixed according to the worst-case ambient light condition, in which case the time it would take for the light exposure measurement circuit 451 to reach the threshold voltage level would be at a maximum. In strong lighting conditions, the exposure time of the pixels may be short, but the readout time will remain the same as for the worst-case lighting conditions, therefore causing some loss of reading speed efficiency. However, the FIG. 12 timing arrangement generally provides a constant output data rate, which simplifies decoding. This effect may be advantageous where limitations on decoder speed exist, such as where an external decoder (such as certain types of remotely located decoders to which a multiplicity of optical readers are connected) is being used for receiving and decoding the raw output data (such as, e.g., raw bar/space signal data).

In implementation, the light exposure measurement circuitry and related exposure time control circuitry (such as that shown in FIG. 17, for example) preferably resides on the same chip substrate as the imaging array 102 and selected other circuitry. In particular, such circuitry preferably is incorporated as part of the circuitry of shutter time controller 121. In the case where the timing arrangement of FIGS. 10 and 11 is used, shutter time controller 121 connects to clock generator 122 which adjusts the frequency of the appropriate clocks and control signals in response to the measured light level. The clock generator 122 connects to the address generator/decode logic block 123, which controls the charge time and readout rate of the pixels of the imaging array 102.

For the FIG. 12 timing arrangement, signal processing of the output of the imaging array 102 (see FIG. 1) may be carried out using signal processing circuitry having constant time-domain response characteristics in order to provide constant spatial bandwidth. Many conventional fixed-response analog or digital signal processing systems can be employed or adapted for use with the FIG. 12 timing arrangement.

If the timing arrangement of FIGS. 10 and 11 is used, on the other hand, conventional signal processing methods are likely to be inappropriate because the data rate from the output of the imaging array 102 will generally vary with the level of received light, while the time domain response of the signal processing circuitry remains constant. Using conventional signal processing circuitry with a static time domain response would tend to cause the spatial bandwidth (qualitatively, the smallest feature size on the target passed by the signal processor) to vary with light level. Because bar code minimum feature sizes are often chosen to be just large enough to allow them to be clearly distinguished from particulate features of the base medium and/or the ink, it is generally desirable to keep the spatial bandwidth as close to constant as possible. For this reason, a preferred signal processor used with the variable frequency timing arrangement of FIGS. 10 and 11 is constructed so as to vary its time domain response in proportion to the imaging array data clock, in such a way that the spatial response is invariant.

A preferred signal processor comprises a filter such as a synchronous digital filter having a finite-impulse response (FIR) or infinite-impulse response (IIR), a synchronous transversal analog filter using clocked bucket-brigade delay lines (generally based on CCD or sample-and-hold techniques), or a switched-capacitor filter, each of which can be configured to provide invariant time domain response by using the same adjusted-frequency clock signal as used to access and readout the pixels of the imaging array 102.

Synchronous delay-line differentiators may also be used in the signal processing, in which the derivative or derivatives used for peak detection are derived from the difference between the current pixel amplitude and that of its adjacent neighbor(s). Delay-line based differentiators are further described in, for example, U.S. Pat. No. 5,463,211, incorporated herein by reference as if set forth fully herein. Similarly, peak detectors whose time-domain attack and decay characteristics vary according to an input data clock rate can be utilized in the signal processing circuitry and implemented in a straightforward manner by those skilled in the art. An advantage of combining the variable frequency imaging array (such as described, for example, with respect to the timing diagrams of FIGS. 10 and 11) and synchronous signal processor is that the time between image capture and successful decode is minimized over a large range of light levels.

Using a CMOS process, both the adaptive exposure control pixel of FIG. 15 and the adaptive exposure control loop circuitry described above, as well as the signal processing circuitry if desired, could be implemented on the same substrate as the imaging array 102. The adaptive exposure control loop circuitry can be designed to consume very little power, allowing it to be enabled constantly. Another advantage of this adaptive exposure control loop is that the exposure time may, during a test read period, be nearly optimally set before the user enables the bar code reader, reducing considerably the time required to read the bar code. For example, a bar code reader can sample the ambient light when the bar code reader is not in use (i.e., not triggered by the user), and can use the sample light readings to set the exposure time prior to triggering.

While the above-described systems apply to single-line optical readers and to multiple-line optical readers in which the lines do not intersect, different approaches may be necessary where intersecting lines of pixels are used since the pixels at the intersections need to be read more than once. Examples of optical readers having potentially intersecting lines of pixels are those shown, for example, in FIGS. 3, 4 and 5. One approach to address the problem of having to read the same pixel multiple times is that, under high level light conditions, each line of pixels may be exposed and read out before processing the next line of pixels. This approach, however, is somewhat unsatisfactory in that it results in slower performance at low light levels, as the generally time-consuming exposure process must be done separately, in serial, for each line of pixels. It is therefore preferred to allow exposure of all of the lines of pixels to occur simultaneously.

Figure 13:
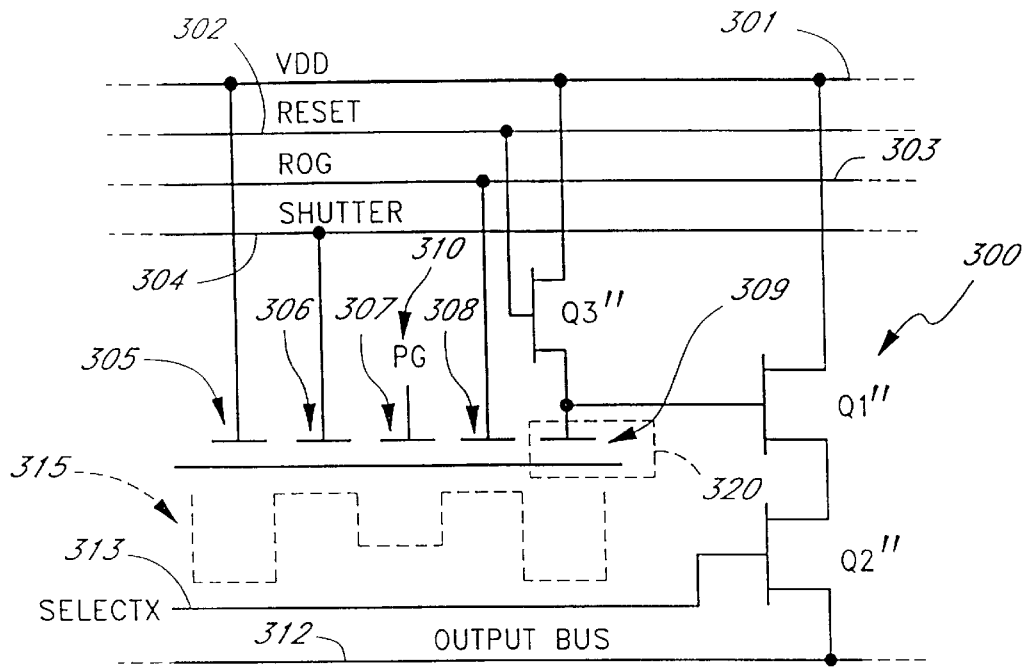
FIGS. 13 and 14 are diagrams of a CCD cell in accordance with a preferred embodiment of the invention having non-destructive read-out and simultaneous exposure of the CCD cells.
Figure 14:
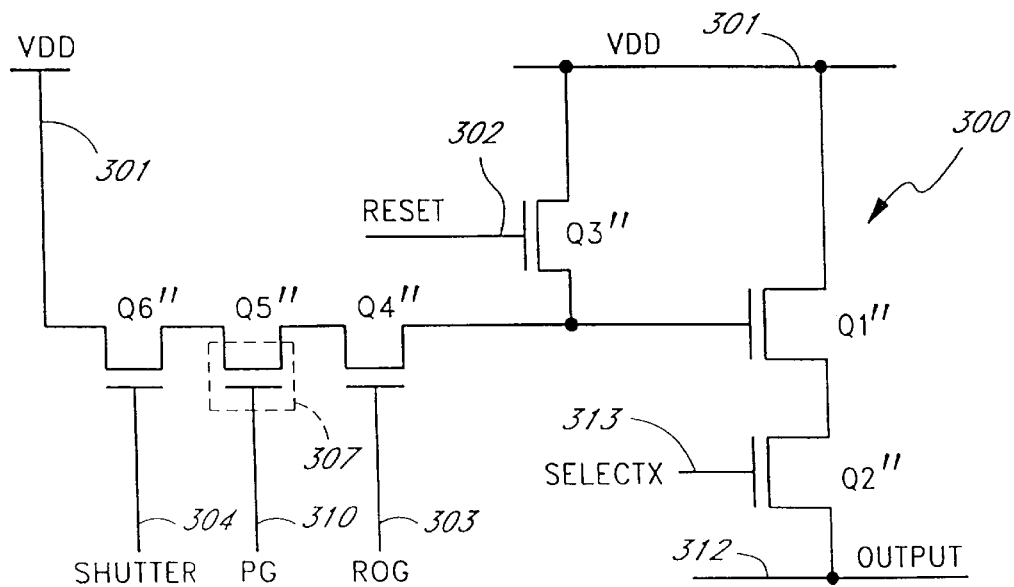

A pixel design which provides for non-destructive readout and simultaneous exposure of multiple lines of pixels is shown in FIGS. 13 and 14. FIG. 14 depicts a circuit schematic of the pixel site circuit 300, while FIG. 13 depicts a schematic of the pixel site circuit including representation the charge stored in MOSFET Q1" using a potential graph 315.

In FIGS. 13 and 14, a set of common signals is provided to each of the pixels of an imaging array (such as imaging array 102 of FIG. 1). Thus, a voltage source (VDD) signal 301, a reset signal 302, a read out gate (ROG) signal 303, a shutter signal 304, and an output bus line 312 are common for all pixels of the imaging array. A separate select signal 313 is unique to each pixel.

In operation of the pixel circuit of FIGS. 13–14, free electrons generated at an extended photogate 307 of MOSFET Q5" are drained by activating the shutter gate 306, using shutter signal 304, until exposure of the pixel is to begin. At such a time, the shutter gate 306 (i.e., the gate of MOSFET Q6" shown in FIG. 14) closes and the photogate 307 begins to accumulate charge. To end the exposure of the pixels, the read out gate 308 (i.e., the gate of MOSFET Q4" shown in FIG. 14) is enabled by asserting the read out signal 303. The read out gate 308 then passes the accumulated charge to the storage region 320 under the output source follower gate 309 (i.e., the gate of MOSFET Q1"). This charge remains in the storage region 320 while the pixel is selected (by asserting select signal 313 associated with the particular pixel to be accessed), as many times as is necessary to read out the charge information for each pixel line in which the particular pixel is a member in the total pattern of pixels. The source follower MOSFET Q1" is connected to the output bus line 312 through the select MOSFET Q2" when the select signal 313 is asserted, thereby allowing reading of the accumulated charge (i.e., voltage) level.

Two options for resetting the pixel circuits 300 of the imaging array are then possible. The first option is to reset all pixels simultaneously by asserting the common reset signal 302 after the entire image has been read. This approach is the simpler of the two, because only a single reset line 302 is needed for all pixels of the imaging array. Alternatively, each pixel may be independently reset immediately after the last read by activating that pixel's reset signal 302, so as to allow the reset level to be subtracted from the signal level (as explained previously, for example, with respect to FIG. 9). This second option provides much-reduced fixed pattern noise, at the expense of a separate reset signal 302 line for each pixel.

FIG. 20 is a diagram of portions of a preferred optical reader including condensed CMOS circuitry. The preferred optical reader 600 of FIG. 20 comprises a printed circuit board 605 upon which is mounted a CMOS chip 606 that includes integrated CMOS circuitry. The integrated CMOS circuitry includes an imaging array 607 (having a pattern, for example, such as any of those shown in FIGS. 2 through 5, or otherwise) and miscellaneous CMOS circuitry 608. The miscellaneous CMOS circuitry 608 may comprise one or more of an exposure control circuit, signal processing circuitry, and decoding circuitry, as previously described herein. The preferred optical reader 600 of FIG. 20 further comprises a lens 601 that collects light reflected from a symbol (e.g., bar code label) 611 and focuses the collected light onto the imaging array 607.

It may be noted that while various embodiments described herein depict individually addressable pixels, it will be appreciated by those skilled in the art that straightforward modifications may be made to allow addressability of selected groups of pixels as well.

An optical reader design comprising a single-chip optical reading circuitry with integrated circuit topologies implemented in CMOS may provide a number of advantages over other optical readers such as CCD-based optical readers and flying spot laser scanners. First, a single-chip CMOS optical reader may provide lower cost of manufacture due in part to the fact that conventional CMOS processing is very highly developed and common yet simpler and less affected by silicon defects than processes used for CCDs. Further, additional necessary support functions may be integrated on the same CMOS chip, reducing their cost as well and lowering the overall system cost. Another advantage is smaller size, again resulting from the integration of imaging related circuitry. For example, a complete optical reader may be constructed from the FIG. 1 single-chip CMOS circuit, a lens (such as a single-zoned or a multi-zoned focusing lens), and a relatively few external passive components. Another advantage of the device is higher expected reliability, due to the reduced number of external interconnections. Finally, such a device could achieve substantially lower power consumption than, for example, a CCD chip, which consumes most of its power in its clock drivers which are required to simultaneously drive a gate at every pixel site—a significant capacitive load. The CMOS imaging array (such as shown in FIG. 16, for example), on the other hand, has individual addressing of pixels.

A potential disadvantage, if any, of CMOS imaging circuitry is that the pixel site circuitry can occupy a significant (though decreasing as processing improves) amount of area, leading to lower fill factors, larger pixel pitch and ultimately low resolution (since cost is directly related to silicon area). These potential disadvantages are less apparent in one-dimensional (i.e., linear) imaging arrays configured for reading a one-dimensional code (such as shown, for example, in FIG. 2). Linear CMOS arrays can have small pixel pitch, and may further have fill factors approaching 100% by locating the pixel access circuitry along the side of the pixels, between lines. Remaining silicon area between lines in these embodiments may be used for other support circuitry. Improved collection efficiency and tolerance of target edge disfiguration can be realized in a linear array by using long rectangular pixels, with the long axis orthogonal to the imaging line.

Moreover, for CMOS imaging arrays having two-dimensional patterns, good multi-directional patterns can be created using only a relatively small amount of the total two-dimensional space (see, e.g., FIGS. 3–5). The space between the pixels in such two-dimensional patterns may be used to locate the pixel-site circuitry needed to support the individual pixel addressability (including non-destructive read-out capability, if desired), thereby allowing the total area of the CMOS imaging array to be at least as small as a two-dimensional CCD array. Compared to flying-spot laser scanners or other laser-based scanning products, several more advantages may be realized by a condensed CMOS circuitry optical reader as described in its various embodiments herein. For example, the CMOS optical reader may exhibit higher reliability while consuming less power and having lower cost, since no moving parts (i.e., a dithering mirror, rotating facet wheel, etc.) are necessary for scanning a laser beam, and because the laser is eliminated. Also, the CMOS optical reader may be less expensive and simpler in some aspects because the need for a heat-sinking mechanism may be eliminated, and the need for laser drive circuitry, diagnostic/safety-related hardware, beam-forming lens, aperture, and associated mounting apparatus may also be also alleviated.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. An optical reader comprising:
    an imaging array comprising a plurality of imaging array pixels;
    at least one exposure control pixel distinct from said plurality of imaging array pixels oriented in the same direction as said imaging array pixels, and sharing a same substrate with said imaging array pixels, whereby a level of ambient light is measured and an exposure control pixel voltage output signal in response thereto;
    a comparator having a first input connected to said at least one exposure control pixel, and a second input connected to a threshold signal, whereby said comparator changes output states in response to said exposure control pixel voltage output signal exceeding said threshold signal; and
    a clock generator responsive to said comparator for regulating an amount of exposure time of said imaging array pixels.

2. The optical reader of claim 1 wherein said clock generator regulates said amount of exposure time of said imaging array pixels by adjusting a duty cycle of imaging array pixel charge time based on an amount of exposure time of said exposure control pixel.

3. The optical reader of claim 1 further comprising a signal processing circuit connected to an output of said imaging array, wherein said clock generator regulates said amount of exposure time of said imaging array pixels by adjusting a clock frequency of a readout clock connected to said imaging array, and wherein said clock generator correspondingly adjusts a frequency of a clock connected to said signal processing circuit.

4. The optical reader circuit of claim 1 wherein said imaging array, exposure control pixel, comparator, and clock generator are fabricated using a CMOS process and combined onto the same CMOS chip.

5. The optical reader circuit of claim 4 further comprising a signal processing circuit connected to said imaging array and a decoder connected to said signal processing circuit, said signal processing circuit and said decoder combined onto said CMOS chip.

6. The optical reader of claim 3, wherein said signal processing circuit comprises either an infinite impulse response (IIR) digital filter or a finite impulse response (FIR) digital filter.

7. The optical reader of claim 3, wherein said signal processing circuit comprises a synchronous transversal analog filter incorporating clocked bucket-brigade delay lines.

8. The optical reader of claim 3, wherein said signal processing circuit comprises a switched capacitor filter.

9. The optical reader of claim 1, further comprising a serial shift register having an input connected to said comparator, said shift register having a plurality of tapped stages;

wherein each of said imaging array pixels is controlled by a reset control signal; and wherein each reset control signal is generated from a different tapped stage of said shift register.

10. The optical reader of claim 9, wherein each reset control signal is asserted for an amount of time proportional to said amount of exposure time of said exposure control pixel.

11. A method for optical reading, comprising the steps of:

collecting light on a set of imaging pixels and on an exposure control pixel separate and distinct from said set of imaging pixels but oriented in the same direction as said imaging array pixels, and sharing a same substrate with said imaging array pixels;

monitoring an accumulated level of light energy collected by said exposure control pixel;

comparing said accumulated level of light energy to a threshold level; and terminating the collection of light on said set of imaging pixels in response to said accumulated level of light energy exceeding said threshold level.

12. The method of claim 11, further comprising the steps of:

adjusting a duty cycle of a clock based on an amount of exposure time of said exposure control pixel; and controlling exposure time of said set of imaging pixels using said clock.

13. The method of claim 11, further comprising the step of sequentially activating light collection at each of said imaging pixels in response to an initial signal, wherein said step of terminating the collection of light on said set of imaging pixels comprises the step of sequentially deactivating light collection at each of said imaging pixels in response to said accumulated level of light energy collected by said exposure control pixel exceeding said threshold level.

14. The method of claim 13, further comprising the step of propagating said initial signal along a shift register to sequentially activate light collection at each of said imaging pixels, and propagating an end-of-exposure time signal along said shift register to sequentially deactivate light collection at each of said imaging pixels.

15. The method of claim 11, further comprising the steps of:

adjusting a clock frequency of a readout clock connected to said imaging array, whereby an amount of exposure time of said imaging pixels is regulated; and reading out light collection information from said imaging array under control of said readout clock.

16. The method of claim 15, further comprising the step of applying an output signal from said imaging array to a signal processor, said signal processor varying its time domain response in proportion to the adjustment in clock frequency of said readout clock, such that the spatial response of said signal processor is invariant.

17. The method of claim 16, wherein said step of applying an output signal from said imaging array to a signal processor comprises the step of applying the output signal to an infinite impulse response (IIR) or finite impulse response (FIR) digital filter.

18. The method of claim 16, wherein said step of applying an output signal from said imaging array to a signal processor comprises the step of applying the output signal to a synchronous transversal analog filter having clocked bucket-brigade delay lines.

19. The method of claim 16, wherein said step of applying an output signal from said imaging array to a signal processor comprises the step of applying the output signal to a switched capacitor filter.

20. The method of claim 11, wherein said imaging pixels are arranged in a two-dimensional pattern.

21. The method of claim 11, further comprising the step of collecting light on a plurality of exposure control pixels separate and distinct from said set of imaging pixels, said exposure control pixels dispersed throughout the two-dimensional pattern of imaging pixels.

22. The method of claim 11, wherein said step of collecting light on an exposure control pixel comprises the step of receiving light incident upon a photoelectric diode;

said step of monitoring an accumulated level of light energy collected by said exposure control pixel comprises the step of transferring charge output from said photoelectric diode and storing said charge on a capacitor connected to said photoelectric diode; and said step of comparing said accumulated level of light energy to a threshold level comprises the step of connecting an output of said capacitor and a reference voltage to inputs of a comparator, and generating a comparison output signal thereby.

* * * * *